US007616221B2

(12) United States Patent
Kudo et al.

(10) Patent No.: US 7,616,221 B2
(45) Date of Patent: Nov. 10, 2009

(54) DRIVING CIRCUITS FOR DISPLAY DEVICE

(75) Inventors: Yasuyuki Kudo, Fujisawa (JP); Akihito Akai, Yokohama (JP); Takuya Eriguchi, Yokosuka (JP); Kazuo Okado, Kokubunji (JP); Hiroki Aizawa, Yokohama (JP)

(73) Assignee: Renesas Technology Corp., Tokyo (JP)

( * ) Notice: Subject to any disclaimer, the term of this patent is extended or adjusted under 35 U.S.C. 154(b) by 663 days.

(21) Appl. No.: 10/879,047

(22) Filed: Jun. 30, 2004

(65) Prior Publication Data

US 2005/0052477 A1 Mar. 10, 2005

(30) Foreign Application Priority Data

Aug. 22, 2003 (JP) ............................. 2003-298238
Jan. 23, 2004 (JP) ............................. 2004-015288

(51) Int. Cl.
*G09G 3/36* (2006.01)
*G09G 5/10* (2006.01)
*G06F 3/038* (2006.01)

(52) U.S. Cl. .......................... 345/690; 345/94; 345/208

(58) Field of Classification Search ................. 345/690, 345/88, 89, 204, 87, 94, 95, 208, 210
See application file for complete search history.

(56) References Cited

U.S. PATENT DOCUMENTS 6,567,062 B1 * 5/2003 Kudo et al. ................... 345/92
7,158,108 B2 * 1/2007 Hagino ......................... 345/89
2002/0036610 A1 * 3/2002 Ito et al. ........................ 345/89
2003/0016189 A1 * 1/2003 Abe et al. ...................... 345/55
2007/0057884 A1 * 3/2007 Akai et al. ..................... 345/89

FOREIGN PATENT DOCUMENTS

JP 2000-66642 3/2000

* cited by examiner

*Primary Examiner*—Amr Awad
*Assistant Examiner*—Stephen G Sherman
(74) *Attorney, Agent, or Firm*—Antonelli, Terry, Stout & Kraus, LLP.

(57) ABSTRACT

A driving circuit provided by the present invention is characterized in that the driving circuit selects a gray-scale voltage in accordance with high-order bits of display data from a group of gray-scale voltages with their voltage level varying step by step from fractional time period to fractional time period, which are set in advance, and outputs the selected gray-scale voltage during a time period between the start of a scanning period and a time at which a number assigned to a fractional time period matches quantitative information contained in low-order bits of the display data. In addition, the driving circuit provided by the present invention is also characterized in that the time ratio of the first fractional time period is set at a relatively high value while the time ratios of the second and subsequent fractional time periods are each set at a relatively low value.

21 Claims, 6 Drawing Sheets

BLOCK CONFIGURATION

TIMING CHARTS

DRIVING CIRCUITS FOR DISPLAY DEVICE

CLAIM OF PRIORITY

The present application claims priority from Japanese application JP 2004-015288, filed on Jan. 23, 2004, which further claims priority from Japanese patent application JP 2003-298238, filed on Aug. 22, 2003, the content of which is hereby incorporated by reference into this application.

BACKGROUND OF THE INVENTION

1. Field of the Invention

The present invention relates to a driving circuit for driving a display device employed in a mobile apparatus such as a hand phone. More particularly, the present invention relates to a driving method adopted in a display device, which has a low power consumption and a small circuit scale, and a driving circuit provided for such a display device.

2. Description of the Related Art

A driving circuit provided for a conventional display device such as a TFT liquid-crystal display is disclosed in Japanese Patent Laid-open No. 2000-66642, which is referred to hereafter as patent reference 1. In order to implement a method of driving the display device, the driving circuit includes gray-scale voltage lines, a decoder, a selector and a gray-scale voltage generation unit. The driving circuit has as many gray-scale voltage lines as gray scales of high-order bits of display data. The decoder is a component for outputting a pulse signal for each time period set in advance for low-order bits of the display data. Receiving the high-order bits of the display data and a pulse signal output by the decoder, the selector selects a gray-scale voltage line corresponding to the high-order bits only during a period in which the pulse signal is in an active state and outputs a gray-scale voltage appearing on the selected gray-scale voltage line to a data line. The gray-scale voltage generation unit is a component for supplying a gray-scale voltage to each of the gray-scale voltage line. The gray-scale voltage varies in accordance with the number of gray scales of low-order bits of the picture display data.

In the configuration and by the operation described above, a display with many gray scales can be obtained by using a driving circuit having a small scale.

With the driving method disclosed in patent reference 1, however, a time period during which a gray-scale voltage appears on the data line is dependent on the display data. Thus, after a gray-scale voltage is output to a specific data line, the gray-scale voltage may be output to a data line adjacent to the specific data line. In such a case, it is quite within the bounds of possibility that the gray-scale voltage output to the specific data line varies so that a desired level of the display luminance cannot be obtained.

In addition, in accordance with the driving method disclosed in patent reference 1, the length of a time period during which a gray-scale voltage appears on the data line is equal to a quotient obtained by dividing 1 scanning period by the number of gray scales of the display-data low-order bits. During such a short fractional time period, it is difficult to change the gray-scale voltage to a desired level.

SUMMARY OF THE INVENTION

It is thus an object of the present invention to provide a display-device driving circuit in which a gray-scale voltage output to any specific data line has only a small effect on a data line adjacent to the specific data line and a time margin in a transition of the gray-scale voltage to another level is large.

The driving circuit provided by the present invention is based on the configuration disclosed in patent reference 1 so as to realize a multi-gray-scale display using only a small circuit scale. Instead of outputting a gray-scale voltage only in a time period during which a number assigned to the fractional time period matches quantitative information contained in low-order bits of display data as is the case with the method disclosed in the patent reference, in the driving circuit provided by the present invention, the gray-scale voltage is output during a time period between the start of a scanning period and a time at which a number assigned to a fractional time period matches the quantitative information contained in low-order bits of display data. By changing the time period in which the gray-scale voltage is output in this way, the gray-scale voltage output during a first fractional time period may have a large amplitude in some cases in dependence on the state of a scanning period immediately preceding the first fractional time period. During the second and subsequent fractional time periods, however, the gray-scale voltage always has a small amplitude.

In this case, the effect of a gray-scale voltage output to any specific data line on a data line adjacent to the specific data line is exhibited during the second and subsequent fractional time periods. In addition, the smaller the amplitude of the gray-scale voltage, the fewer the transitions of the gray-scale voltage. From this fact, by using the driving circuit provided by the present invention, it is possible to achieve the first object of the present invention to reduce the effect of a gray-scale voltage output to any specific data line on a data line adjacent to the specific data line.

On the other hand, the characteristic that the gray-scale voltage makes a transition to a small amplitude during the second and subsequent fractional time periods implies that the transition time is short. That is to say, the second and subsequent fractional time periods can each be made shorter than the first fractional time period. For this reason, in the present invention, the time ratio of the first fractional time period is set at a relatively high value while the time ratios of the second and subsequent fractional time periods are set at a relatively low value. In this way, the scanning period can be divided with a high degree of efficiency. Thus, it is possible to achieve the second object of the present invention to increase a time margin in a transition of the gray-scale voltage to another level.

In accordance with the present invention, there is provided a configuration in which a gray-scale voltage with the level thereof varying from fractional time period to fractional time period in a scanning period is selected on the basis of high-order bits of display data and a time period of outputting the gray-scale voltage is controlled in accordance of low-order bits of the display data. Thus, it is possible to realize a multi-gray-scale display using only a small steady-state voltage and a small circuit scale.

In addition, in accordance with the present invention, the gray-scale voltage is output during a time period between the start of a scanning period and a time at which a number assigned to a fractional time period matches the quantitative information contained in low-order bits of display data. Thus, during the second and subsequent fractional time periods, the gray-scale voltage varies to another level at small amplitudes so that it is possible to reduce the effect of a gray-scale voltage output to any specific data line on a data line adjacent to the specific data line.

On the top of that, in accordance with the present invention, the time ratio of the first fractional time period is set at a relatively high value while the time ratios of the second and subsequent fractional time periods are set at a relatively low value. Thus, it is possible to increase a time margin in a transition of the gray-scale voltage to another level.

Furthermore, in accordance with the present invention, the direction of the transition of the gray-scale voltage on the high-voltage side of the scanning period is opposite to the direction of the transition of the gray-scale voltage on the low-voltage side of the scanning period. Thus, the transient characteristic of the output waveform can be made uniform without regard to whether the level of the output gray-scale voltage is high or low. As a result, it is possible to reduce display-luminance variations caused by dispersions of the transient characteristic.

Moreover, in accordance with the present invention, there is provided a structure allowing the transition magnitude of the gray-scale voltage to be adjusted. Thus, it is possible to improve display-luminance variations caused by a dull state of the driving voltage waveform and held-voltage variations of pixels.

In addition, in accordance with the present invention, the direction of the transition of the gray-scale voltage is changed from frame to frame or from scanning period to scanning period. Thus, it is possible to improve display-luminance variations caused by a dull state of the driving voltage waveform and held-voltage variations of pixels.

On the top of that, in accordance with the present invention, when displaying fewer gray scales than displayable gray scales, the scanning period is shortened to increase the ratio of the vertical blanking interval to the frame interval. In addition, circuit operations are stopped or only operations entailing a low power consumption are carried out during a vertical blanking interval whenever possible. Thus, the power consumption can be reduced.

DESCRIPTION OF THE PREFERRED EMBODIMENTS

First Embodiment

Figure 1A:
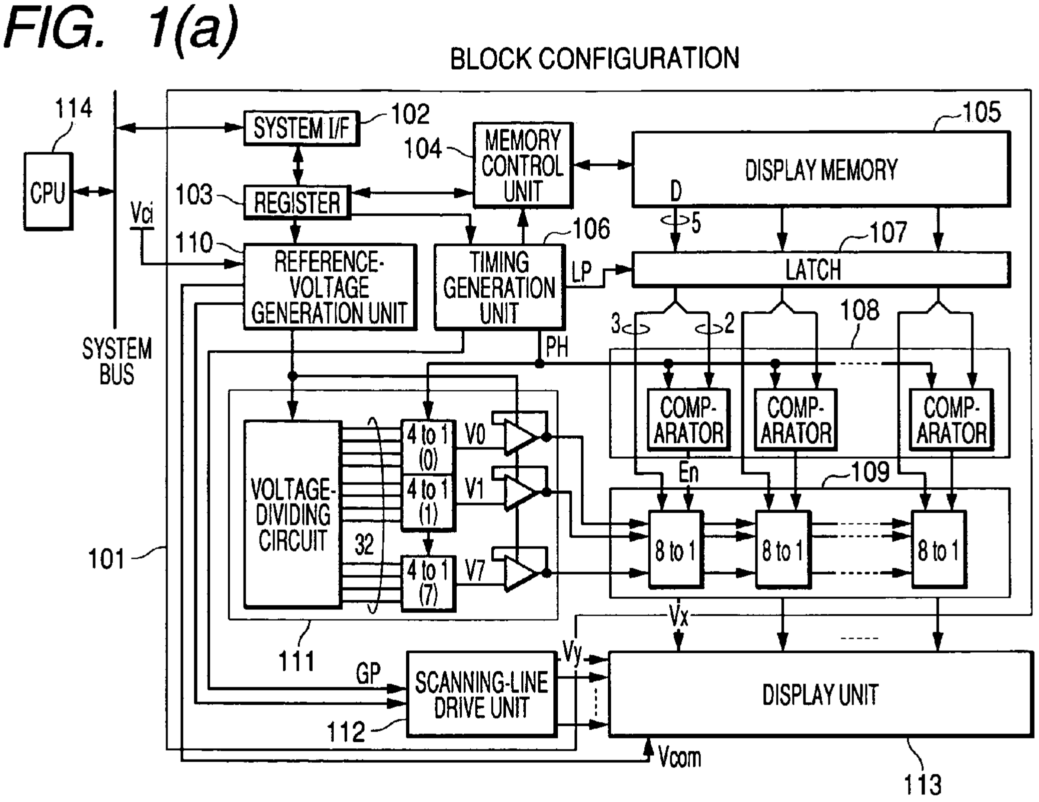
FIGS. 1(*a*) and 1(*b*) are diagrams showing the configuration of a first embodiment of the present invention and operations carried out by the embodiment.
Figure 1B:
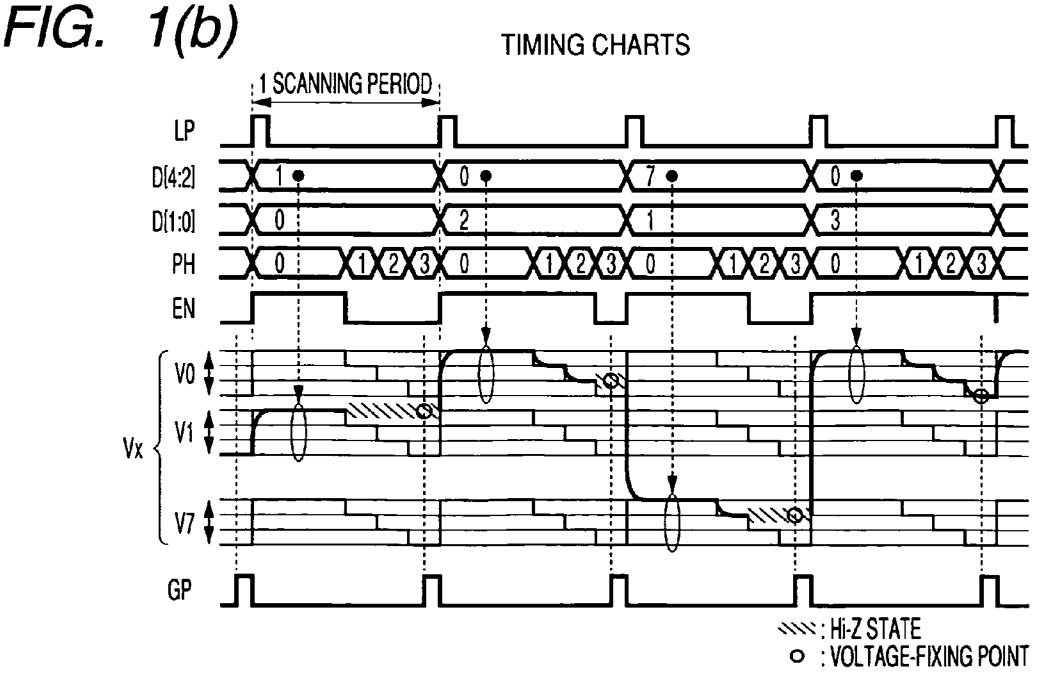

The configuration of a first embodiment of the present invention and operations carried out by the embodiment are explained by referring to FIGS. 1(*a*) and 1(*b*). To begin with, FIG. 1(*a*) is given as a block diagram showing a display device to which the first embodiment of the present invention is applied. In FIG. 1(*a*), reference numerals 101 and 102 denote a driving circuit and a system interface respectively. Reference numeral 103 denotes a data register and reference numeral 104 denotes a memory control unit. Reference numerals 105 and 106 denote a display memory and a timing generation unit respectively. Reference numeral 107 denotes a latch and reference numeral 108 denotes a comparison unit. Reference numerals 109 and 110 denote a gray-scale voltage select unit and a reference-voltage generation unit respectively. Reference numeral 111 denotes a gray-scale voltage generation unit and reference numeral 112 denotes a scanning-line drive unit. Reference numerals 113 and 114 denote a display unit and a CPU respectively. Reference numeral 115 denotes a main memory.

The driving circuit 101 is a controller/driver of the so-called embedded-RAM type. The driving circuit 101 includes a means for implementing a driving method provided by the invention. It is to be noted that this embodiment executes 3two-gray-scale driving method based on a voltage level. Thus, the amount of information included in input display data is 5 bits per pixel. The 5 bits are divided into three high-order bits and two low-order bits.

Operations of the internal block of the driving circuit 101 are explained as follows.

The system interface 102 receives display data and an instruction from the CPU 114, carrying out an operation to pass on them to the data register 103. Details of the operation conform to, for example, "System Interfaces" described in a preliminary specification sheet Rev. 0.6 published by Semiconductor Group of Hitachi Corporation with a title of "384-Channel Segment Driver HD 66763 Having Embedded RAM for 256-Color Display Device". The instruction is information for defining internal operations of the driving circuit 101. The instruction includes a variety of parameters such as a frame frequency, the number of driving lines and color-setting data.

The data register 103 is a block used for storing data of the instruction and passing on the data to other blocks. For example, the frame frequency of the instruction is passed on to the timing generation unit 106. It is to be noted that the display data is also once stored in the data register 103 to be output later to the memory control unit 104 along with an instruction indicating a display position.

The memory control unit 104 is a block carrying out operations to write and read out data into and from the display memory 105. First of all, in a write operation, the memory control unit 104 outputs a signal for selecting an address in the display memory 105 to the display memory 105 on the basis of an instruction received from the data register 103 as an instruction specifying a display position. The memory control unit 104 also outputs display data to the display memory 105 at the same time as the address select signal. By carrying out these operations, the display data can be written into the selected address in the display memory 105. On the other hand, a read operation includes sequentially repeated operations each carried out to select a word line from a predetermined group of word lines in the display memory 105. In each operation, display data on a selected word line can be read out entirely from the display memory 105 through bit lines. A time period for selecting a word line is referred to hereafter as a scanning period whereas a time period for repeating the operation to select a word line is referred to hereafter as a frame interval. It is to be noted that the range of word lines to be selected, the scanning period and the frame interval are set as requested by an instruction.

The display memory 105 has word lines and bit lines respectively corresponding to scanning lines and data lines of the display unit 113. Write and read operations are carried out on the display memory 105 to write and read out display data into and from the display memory 105. It is to be noted that display data read out from the display memory 105 is output to the latch 107.

The timing generation unit 106 internally generates and outputs an LP signal specifying a scanning period described above and a GP signal indicating an output timing of the scanning-line drive unit 112 as described later. The timing generation unit 106 also outputs a PH signal specifying a fractional time period, which is a fraction of a scanning period. Dividing a scanning period into a plurality of fractional time periods is a characteristic of the present invention. Timing charts of these signals are shown in FIG. 1(*b*). As is obvious from FIG. 1(*b*), the PH signal is a signal consisting of two bits. The values of the PH signal are thus 00 (=0), 01 (=1), 10 (=2) and 11 (=3) which appear sequentially during a scanning period.

The latch 107 is a block for latching 5-bit display data D[5:0] output from the display memory 105 synchronously with the rising edge of the LP signal. The latch 107 holds the latched data D[5:0] till the next rising edge of the LP signal before outputting the data to the comparison-processing unit 108.

The comparison-processing unit 108 compares the two low-order bits D[1:0] of the display data with the PH signal, outputting an EN signal to the gray-scale-voltage select unit 109. The EN signal output to the gray-scale-voltage select unit 109 has a value of 1 (high) for PH≦D[1:0] or a value of 0 (low) for PH>D[1:0]. However, the conditions for outputting an EN signal with a value of 1 (high) and a value of 0 (low) can be swapped with each other.

With the EN signal output to the gray-scale-voltage select unit 109 at a value of 1 (high), the gray-scale-voltage select unit 109 selects one of gray-scale voltages V0~V7 to be described later in dependence on the quantitative information contained in the three high-order bits D[4:2] of the display data, and outputs the selected gray-scale voltage. For example, for D[4:2]=000 (=0), the gray-scale-voltage select unit 109 selects and outputs the gray-scale voltage V0. For D[4:2]=111 (=7), the gray-scale-voltage select unit 109 selects and outputs the gray-scale voltage V7. With the EN signal output to the gray-scale-voltage select unit 109 at a value of 0 (low), on the other hand, the gray-scale-voltage select unit 109 sets the output thereof in a high-impedance state without regard to the quantitative information contained in the three high-order bits D[4:2] of the display data. The output of the gray-scale-voltage select unit 109 is connected to a data line of the display unit 113 to be described later. It is to be noted that the three high-order bits D[4:2] of the display data and the EN signal are supplied to the gray-scale-voltage select unit 109 by way of a level shift circuit not shown in the figure. The level shift circuit changes the amplitudes of the three high-order bits D[4:2] of the display data and the EN signal to a level suitable for controlling the gray-scale-voltage select unit 109.

The reference-voltage generation unit 110 is a block for generating a voltage level required in the driving circuit 101 from a power-supply voltage Vci supplied to the reference-voltage generation unit 110. It is to be noted that a charge-pump circuit is typically used for generating the required voltage level.

The gray-scale-voltage generation unit 111 includes a voltage-dividing circuit 115, m (=8) selector circuits 116 and m voltage followers 117. The voltage-dividing circuit 115 is a circuit for dividing an input voltage into gray-scale voltages at 32 (n×m) levels. The selector circuits 116 each select a gray-scale voltage from gray-scale scale voltages set at n (=4) adjacent levels in accordance with the input PH signal. Each of the voltage followers 117 is an operational amplifier for setting the output of the selector circuit 116 associated with the voltage follower 117 in a low-impedance state. The selector circuits 116 are a characteristic of the present invention among the components included in the gray-scale-voltage generation unit 111. With the PH signal set at 00 (=0) the selector circuits 116 each select a gray-scale voltage of the highest level among the for levels. As the value of the PH signal increases, the selector circuits 116 each select a gray-scale voltage of a lower level. As a result, the voltages V0 to V7 output by the gray-scale-voltage generation unit 111 each have a staircase waveform with level transitions synchronized to the value changes of the PH signal as shown in FIG. 1(*b*). It is to be noted that n×m=the xth power of 2, n=the yth power of 2, and m=the zth power of 2 where symbol x denotes the total number of bits composing the display data, symbol y denotes the number of high-order bits in the display data and symbol z denotes the number of low-order bits in the display data. Thus, the following relation holds true x=y+z.

The scanning-line drive unit 112 is a block for applying a select signal synchronized with the GP signal to scanning lines of the display unit 113 to be described later sequentially from one scanning line to the next one. A timing for applying the select signal to the first scanning line is synchronized to a timing to read out data from the first word line of the display memory 105. The timing to change the select signal slightly precedes the start of the scanning period and the start of the scanning period is determined by the LP signal as shown in FIG. 1(*b*). The distance between the timing to change the select signal and the start of the scanning period is referred to as the so-called hold period, which is required to set up a voltage applied to pixels of the display unit 113.

The display unit 113 is a flat panel having the so-called active matrix type. On the display unit 113, a switching transistor is provided at each of pixels, which are each located at an intersection point of a data line and a scanning line. The source terminal of the transistor is connected to the output of the gray-scale-voltage select unit 109 by the data line. The gate terminal of the transistor is connected to the output of the scanning-line drive unit 112 by the scanning line. The drain terminal of the transistor is connected to a display device. It is to be noted that, on the side opposite to the display device, a common electrode is connected. Thus, a difference between the voltage of the drain terminal and a Vcom voltage output to the common Vcom voltage is applied to the display device. It is to be noted that, even though typical types of the display device include a liquid crystal and an organic EL, a display device of any other type can be used as long as the display luminance of the display device having the other type can be controlled by a voltage.

The following description explains a typical waveform of the voltage Vx output to the data line in the driving circuit 101 by referring to a bold line shown in FIG. 1(*b*). First of all, the voltage V1 is selected due to the fact that the quantitative information contained in the three high-order bits of the display data is 001 (=1) during the first scanning period in which a gray-scale voltage of one line is output to a pixel unit. Then, since the quantitative information contained in the two low-order bits of the display data is 00 (=0), the voltage V1 is output only in a time period, during which the value of the PH signal is 00 (=0). As a result, the highest voltage level among the 4 levels of the voltage V1 is held on the data line of the display unit 113. Subsequently, the voltage held on the data line is written into the pixel unit of the display unit 113, being confirmed on the rising edge of the GP signal. Likewise, the voltage V0 is selected due to the fact that the quantitative information contained in the three high-order bits of the display data is 000 (=0) during the next scanning period in which a gray-scale voltage of one line is output to a pixel unit. Then, since the quantitative information contained in the two low-order bits of the display data is 10 (=2), the voltage V0 is output in a time period, during which the value of the PH signal is 00 (=0), 01 (=1) and 10 (=2). As a result, a low voltage level second to the lowest level among the 4 levels of the voltage V0 is held on the data line of the display unit 113. Subsequently, the voltage held on the data line is written into the pixel unit of the display unit 113, being confirmed on the rising edge of the GP signal. In this way, the driving circuit 101 provided by the present invention is capable of writing a gray-scale voltage according to both the three high-order and two low-order bits of the display data onto pixels. Thus, a display of 32 gray scales can be implemented. It is to be noted that, even though the gray-scale voltage transits from a high electric potential to a low electric potential in the first embodiment of the present invention, the gray-scale voltage can also transit from a low electric potential to a high electric potential as well.

As described above, the display device implemented by the first embodiment of the present invention allows a gray-scale expression of low-order bits of display data to be realized by executing output control of a selector, which is a simple circuit. Thus, the steady-state current and scale of the driving circuit are almost the same as those of a case of realizing a gray-scale display of high-order bits of display data. As a result, it is possible to realize a multi-gray-scale display using only a small circuit scale. In addition, in the first embodiment of the present invention, an operation is carried out to output the gray-scale voltage during a time period between the start of a scanning period and a time at which a number assigned to a fractional time period matches the quantitative information contained in low-order bits of display data. Thus, during the second and subsequent fractional time periods, the gray-scale voltage varies to another level at small amplitudes so that it is possible to reduce the effect of a gray-scale voltage output to any specific data line on a data line adjacent to the specific data line. In addition, in the first embodiment of the present invention, the time ratio of the first fractional time period is set at a relatively high value while the time ratios of the second and subsequent fractional time periods are set at a relatively low value. Thus, it is possible to increase a time margin in a transition of the gray-scale voltage to another level.

It is to be noted that, even though the display data is divided into three high-order bits and two low-order bits in the first embodiment of the present invention, the present invention is by no means limited to this division. In general, by reducing the number of high-order bits in the division, the circuit scale and the steady-state current can be decreased. However, the number of low-order bits is increased by the decrease in high-order-bit count so that the number of fractional time periods composing a scanning period also rises by the same decrease in high-order-bit count. Thus, the length of one fractional time period is reduced as well. As a result, the waveform of an output appearing on the data line cannot be accommodated in the fractional time period in some cases so that it is quite within the bounds of possibility that a predetermined gray-scale voltage cannot be written onto the data line. For this reason, it is desirable to divide the display data into a number of high-order bits and a number of remaining low-order bits by considering a relation with the accommodation time of the waveform of an output appearing on the data line.

Figure 2A:
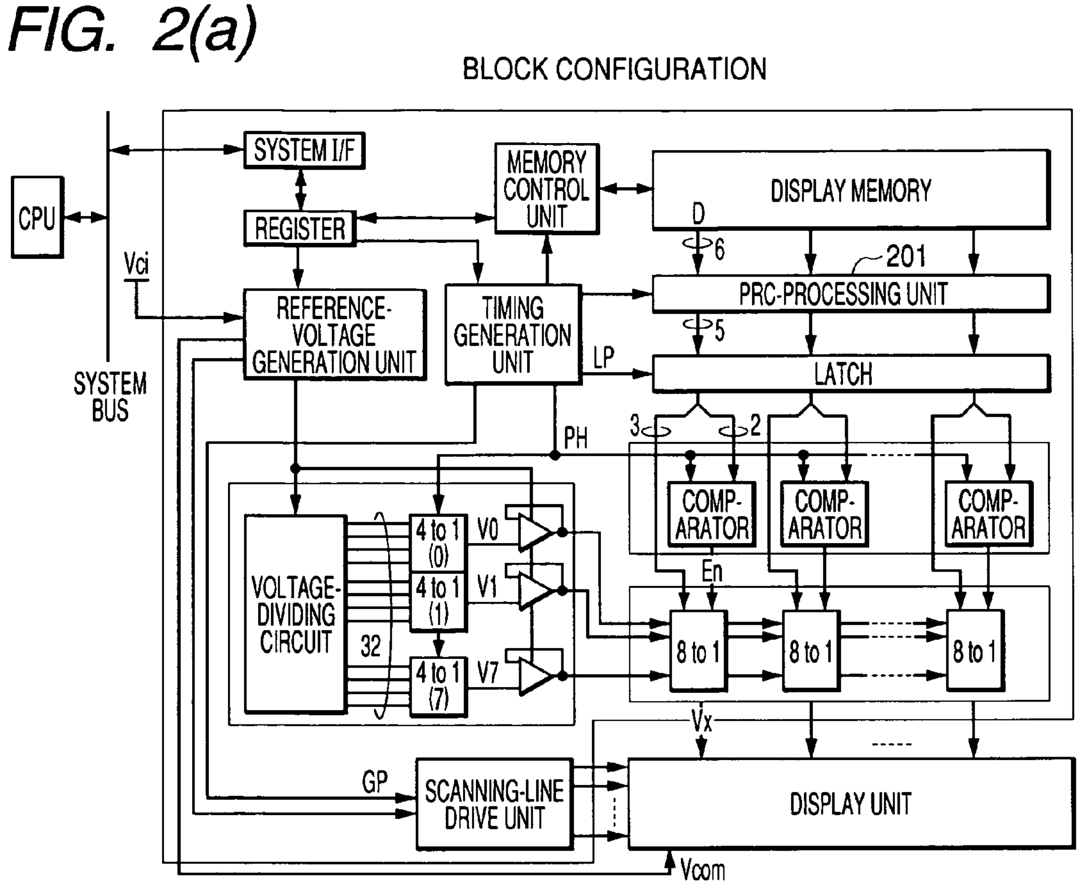
FIGS. 2(*a*) and 2(*b*) are diagrams showing operations carried out by the first embodiment of the present invention.
Figure 2B:
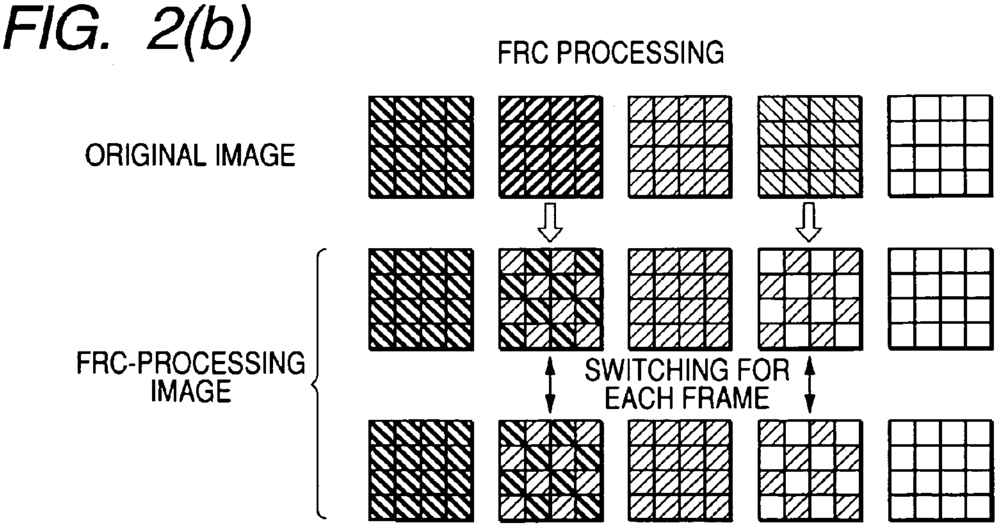

In addition, even though the input display data consists of five bits in the first embodiment of the present invention, the present invention is by no means limited to the display data consisting of five bits. For example, the input display data can consist of six bits. In this case, the display data can be processed by dividing the data into, for example, four high-order bits and two low-order bits. As shown in FIG. 2(*a*), an FRC (Frame Rate Control)-processing unit 201 can be incorporated. As shown in FIG. 2(*b*), the FRC processing is a technique of carrying out space modulation and time modulation on existing gray scales to express seemingly numerous gray scales. In the typical configuration shown in FIG. 2(*a*), the FRC processing is carried out to convert display data of six bits into display data of five bits. The subsequent processing is the same as the driving circuit 101 shown in FIG. 1 as a driving circuit provided for display data of five bits. It is to be noted that, since the FRC-processing unit 201 is a logic circuit, a minute process can be realized by using a CMOS circuit. Thus, even though an increase of the circuit scale and an increase of the steady-state current are required due to addition of the FRC-processing unit 201, the increases are considered to be small in comparison with an increase of an amplifier count and an increase of a selector-input count for a case of simply raising the number of high-order bits from three to four. Thus, the number of gray scales for display data of six bits can be realized by using a relatively smaller circuit scale and a relatively smaller steady-state current.

In addition, in the first embodiment of the present invention, the color concept is omitted to make the explanation simple. A color display can be realized with ease by, for example, composing display data of R (red), G (green) and B (blue) data for each pixel and using a panel of the so-called vertical stripe structure in the display unit. Note that, in this case, it is desirable to provide an R pixel unit, a G pixel unit and a B pixel unit separately.

Second Embodiment

Figure 3A:
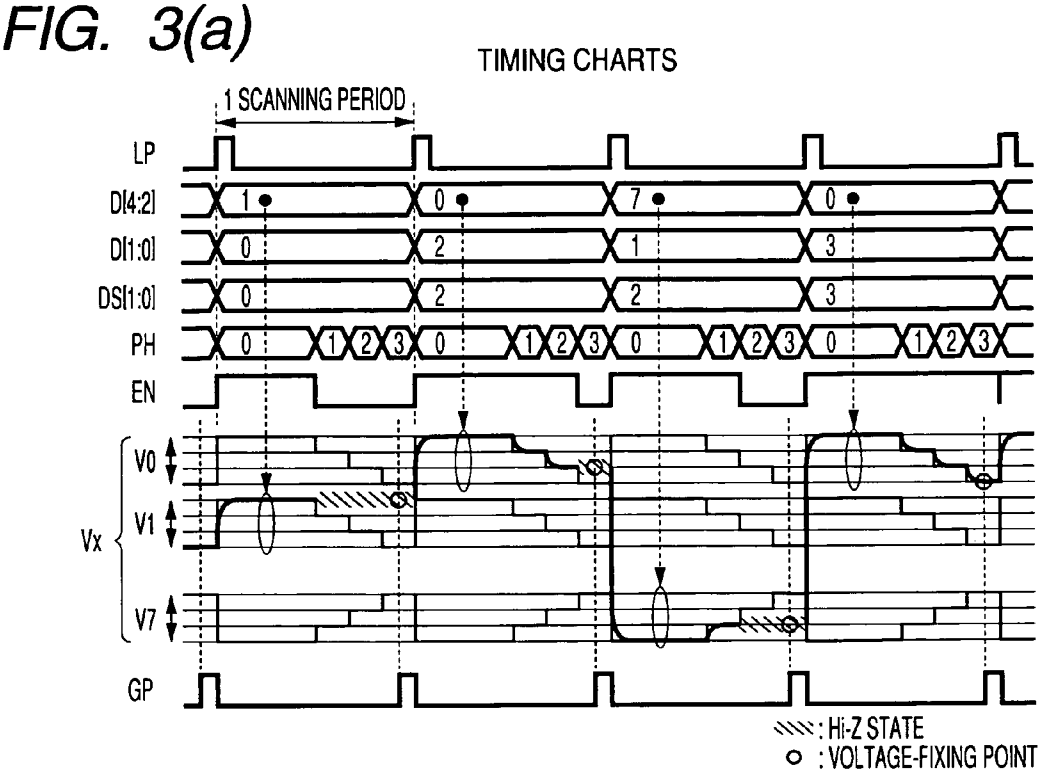
FIGS. 3(*a*) to 3(*c*) are diagrams showing the configuration of a second embodiment of the present invention and operations carried out by the embodiment.
Figure 3B:
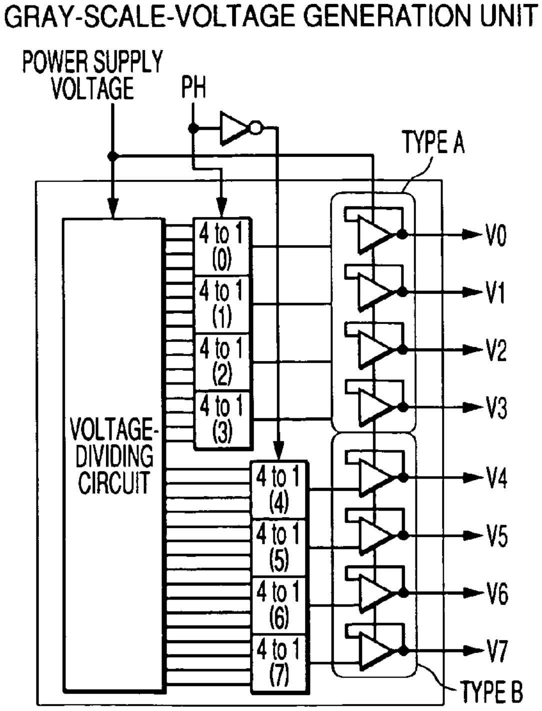
Figure 3C:
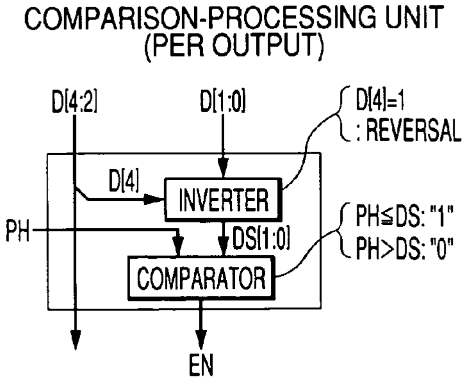

Next, a second embodiment of the present invention is explained. As shown in FIG. 3(*a*), the second embodiment of the present invention is characterized in that the transition direction of the gray-scale voltage in a scanning period on the high electric-potential side is made opposite to the transition direction of the gray-scale voltage in a scanning period on the low electric-potential side. The reason for making the transition directions opposite to each other is explained by referring to FIG. 3(*b*). First of all, in accordance with a known technique, for the purpose of broadening the range of the output voltage, amplifiers of two different types, namely, an amplifier of type A and an amplifier of type B, are provided respectively on the high-voltage side and the low-side voltage in a voltage follower circuit for putting the output voltage in a low-impedance state. The types A and B are mainly different from each other in that the locations of the P and N channels of a MOS transistor composing the amplifier circuit of type A are swapped with each other for a MOS transistor composing the amplifier circuit of type B. By swapping the locations of the P and N channels in this way, the transient characteristic of the amplifier of type A tends to be opposite to the transient characteristic of the amplifier of type B. By the transient characteristic, the shape of the waveform of the output voltage is meant. For example, if an undershoot is easily generated in the amplifier of type A, an overshoot is easily generated in the amplifier of type B. Thus, if the transition direction in the amplifier of type A is made the same as the transition direction in the amplifier of type B, for example, an undershoot is generated only in the amplifier of type A or B. As a result, it is quite within the bounds of possibility that dispersions are caused in the convergence times of both the amplifiers.

In order to solve this problem, the transition direction in the amplifier of type A is made opposite to the transition direction in the amplifier of type B. In order to make the transition direction in the amplifier of type A opposite to the transition direction in the amplifier of type B, in the third embodiment of the present invention, the PH signal is inverted before being supplied to a selector on the low-voltage side as shown in FIG. 3(*b*). In addition, an inverter circuit is added to a comparison-processing unit as shown in FIG. 3(*c*). In such a configuration, the transient characteristics of the voltages output by the amplifiers of types A and B and, hence, their convergence times are made uniform.

In accordance with the second embodiment of the present invention described above, the transient characteristics of the voltages output by the amplifiers of types A and B can be made uniform without regard to whether the level of the output voltage is high or low. Thus, the second embodiment exhibits an effect that a problem of display non-uniformity or the like caused by dispersions of the transient characteristics is hardly raised.

It is to be noted that, even though the transition direction of the gray-scale voltage on the high-voltage side is a downward direction and the transition direction of the gray-scale voltage on the low-voltage side is an upward direction in the second embodiment of the present invention, the present invention is by no means limited to these directions. That is to say, the transition directions can be inverted for some cases.

Third Embodiment

Figure 4:
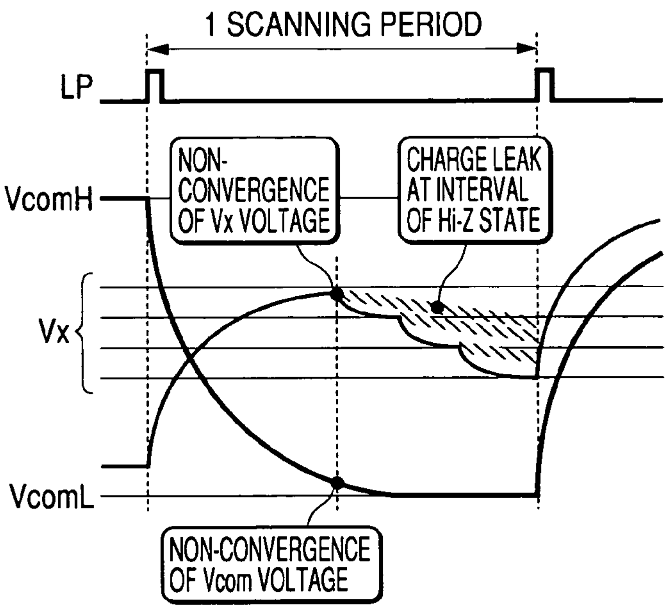
FIG. 4 is a diagram showing driving waveforms of an embodiment of the present invention.
Figure 5:
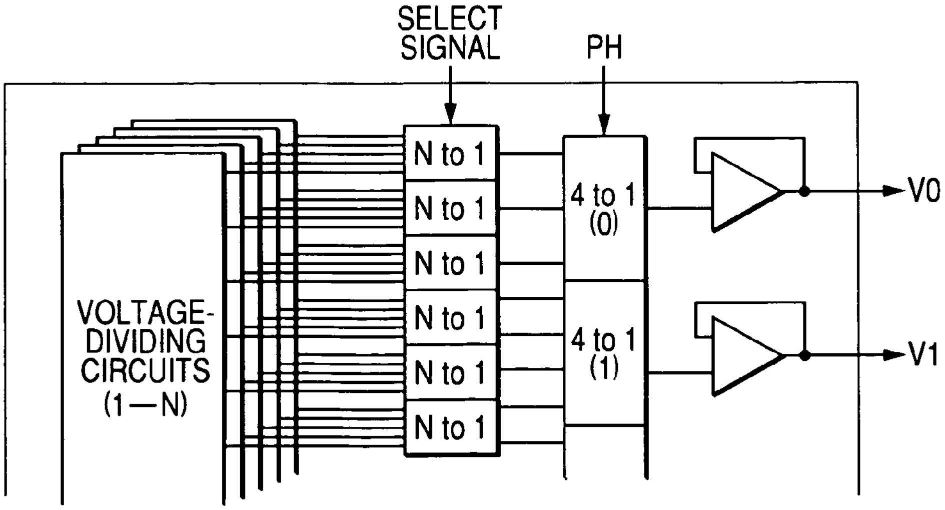
FIG. 5 is a diagram showing the configuration of a third embodiment of the present invention.
Figure 6A:
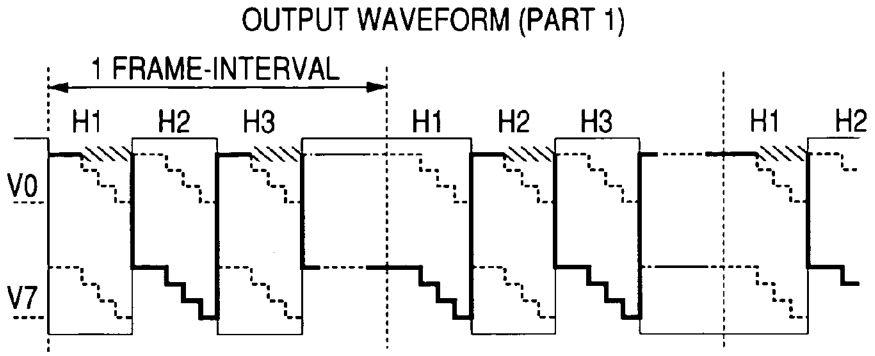
FIGS. 6(*a*) to 6(*c*) are diagrams showing operations carried out by the third embodiment of the present invention.
Figure 6B:
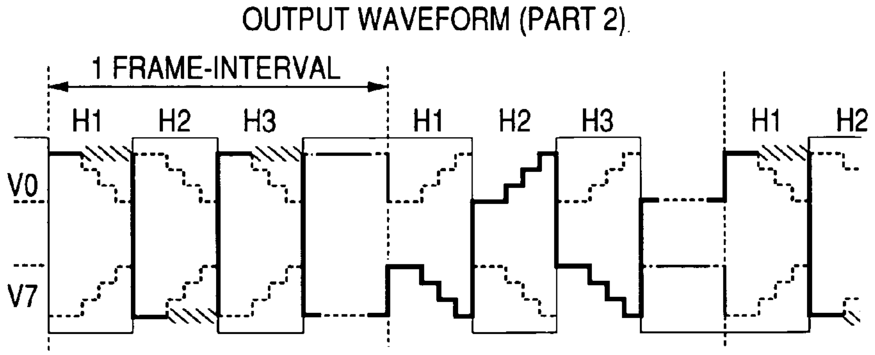
Figure 6C:
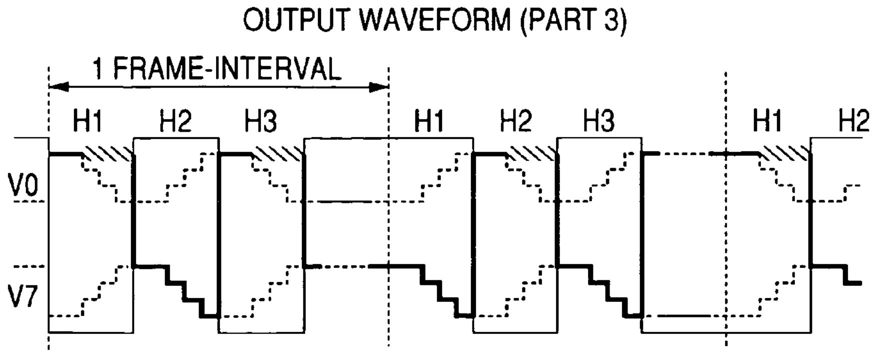

Next, a third embodiment of the present invention is explained by referring to FIG. 4 to FIGS. 6(*a*) to 6(*c*). The third embodiment of the present invention provides a display device capable of improving display-luminance variations caused by a dull state of the driving voltage waveform and held-voltage variations of pixels. FIG. 4 is a diagram showing the driving waveforms of a voltage Vx output to the data line of the display unit and the Vcom voltage output to the common electrode. As is obvious from FIG. 4, in actuality, the waveforms of the voltages each have a dull portion caused by capacitive and resistive components of a device, to which the voltages are output, as opposed to an ideal rectangular shape. Thus, for example, the Vcom voltage does not converge during the first fractional time period and/or the voltage Vx does not converge in each fractional time period. In such cases, the desired gray-scale voltage is not written into a pixel, making it impossible to obtain a correct display luminance. It is to be noted that the Vcom voltage changes from one scanning period to another scanning period on the premise of a common inversion method generally used in a liquid crystal of the active matrix type. As another possible reason why the Vcom voltage changes, electric charge held in the pixel leaks after the output voltage Vx enters a high-impedance state, causing the held voltage to change. This phenomenon is also a cause for making it impossible to obtain a desired display luminance.

As a first method for solving this problem, the level of a gray-scale voltage generated by a voltage-dividing circuit is corrected in advance so as to obtain the desired display luminance even if the gray-scale voltage fluctuates. If the convergence of the Vcom voltage is late, for example, the voltage applied during the first fractional time period decreases most. Thus, the gray-scale voltage output during the first fractional time period needs to be corrected to a level on the high-voltage side. It is to be noted that the optimum value of the correction quantity of the gray-scale voltage is expected to vary from panel to panel used in the display device. In order to cope with such variations, there is conceived a typical configuration in which a plurality of voltage-dividing circuits having gray-scale voltage levels different from each other is provided and an optimum one is selected from the voltage-dividing circuits as shown for example in FIG. 5.

Next, a second improvement method is explained. In general, if variations of the display luminance occur uniformly in all gray scales, practically, no problem is raised. However, the variations of the display luminance differ in dependence on the displayed gray scale. This is because the time period for outputting the gray-scale voltage varies from gray scale to gray scale. Thus, if the length of the time period for outputting the gray-scale voltage can be made uniform, this problem is solved. Aiming at this point, a technique to change the length of the time period to output a gray-scale voltage from frame interval to frame interval has been conceived. FIG. 6(*a*) is a diagram showing a simplest typical operation for realizing this concept. To put it in detail, FIG. 6(*a*) shows the output waveforms of the voltage Vx for a case in which a gray scale with a highest display luminance is displayed in an allover painting way on the premise of the common inversion method cited earlier. By the gray scale with the highest display luminance, a gray scale with a highest electric potential relative to the Vcom voltage is implied. In accordance with the common inversion driving method, the phase of the Vcom voltage is inverted from frame to frame so that the output gray-scale voltage is changed in order to hold the electric potential relative to the Vcom voltage. Thus, by keeping all the transition direction of the gray-scale voltages unchanged throughout the scanning period, the time period for outputting a selected gray-scale voltage is automatically changed. For example, pay attention to a scanning period H1 shown in FIG. 6(*a*). It is obvious that the first and fourth time periods change from frame to frame. If the transition direction of the gray-scale voltage on the high electric potential side is made opposite to the transition direction of the gray-scale voltage on the low electric potential side as is the case with the second embodiment described earlier, these transition directions are reversed from frame to frame as shown in FIG. 6(*b*) to change the first and fourth time periods. In addition to this, by inverting the transition directions also from scanning direction to scanning direction as shown in FIG. 6(*c*), output waveforms similar to those shown in FIG. 6(*a*) can be obtained. It is also possible to easily implement a method of sequentially changing the first to fourth time periods from frame interval to frame interval. This method is not shown in FIG. 6 though.

As another conceivable improvement method, the FRC method described above is adopted and gray scales generated in accordance with the FRC method are displayed. This method is also effective for averaging changes in display luminance. Furthermore, a method of shortening the transition time of the Vcom voltage by setting a target electric potential in the direction of an increasing amplitude in the transition of the Vcom voltage is also an effective method.

In accordance with the third embodiment of the present invention described above, it is possible to provide a display device capable of improving display-luminance variations caused by a dull state of the driving voltage waveform and held-voltage variations of pixels.

Fourth Embodiment

Figure 7A:
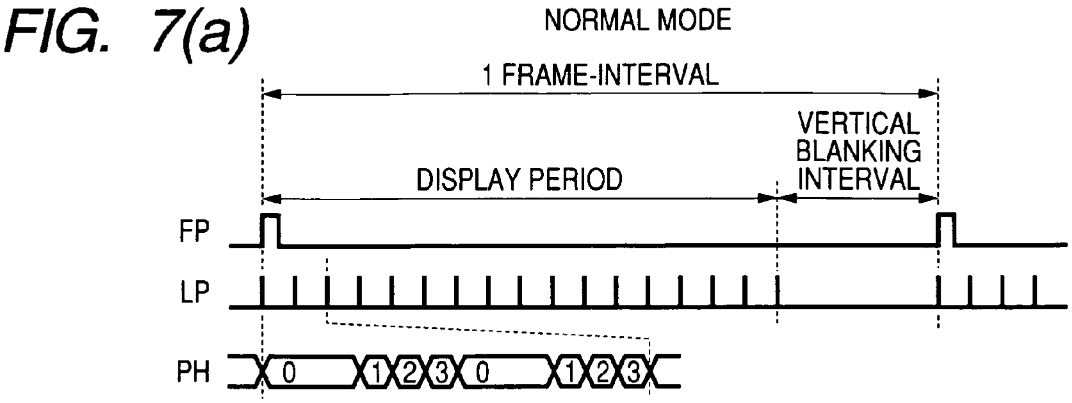
FIGS. 7(*a*) to 7(*c*) are diagrams showing the configuration of a fourth embodiment of the present invention and operations carried out by the embodiment.
Figure 7B:
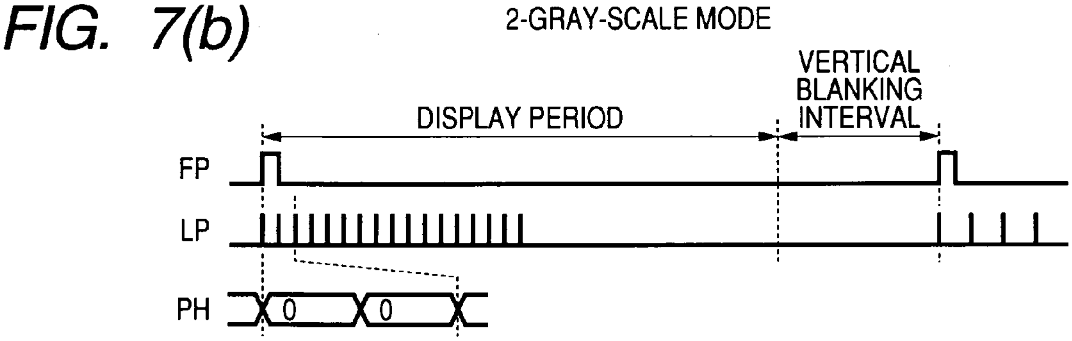
Figure 7C:
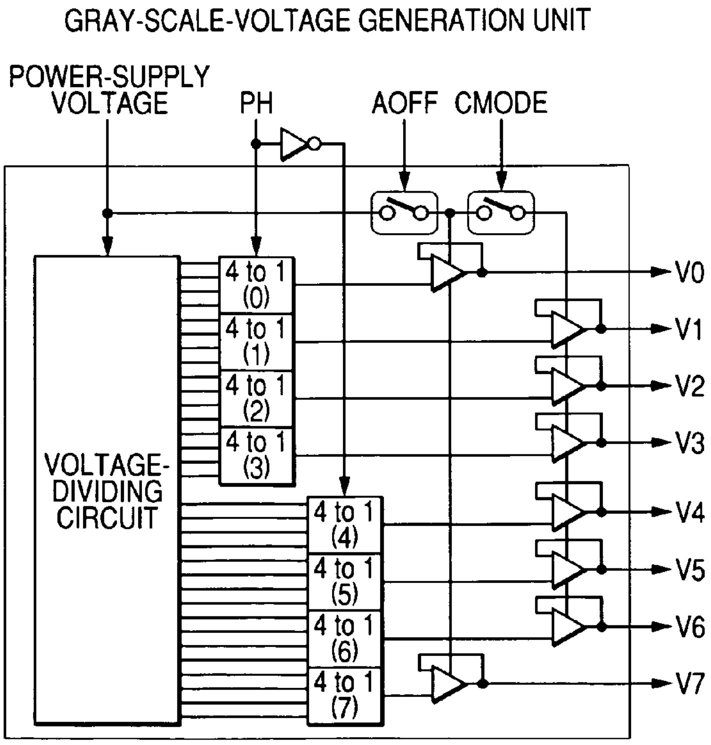

Next, a fourth embodiment of the present invention is explained. The fourth embodiment of the present invention implements a display device, which consumes a smaller amount of power in a color-count reduction mode. The color-count reduction mode is a mode adopting a technique of decreasing the power consumption by reduction of the number of gray scales to be displayed. The color-count reduction mode is used when an operation consuming little power is requested. An example of the operation consuming little power is an operation carried out by a hand phone to display a screen waiting for an incoming phone call. Consider a case of reducing the number of gray scales in the embodiment of the present invention. Assume that a two-gray-scale display is implemented by using the most significant bit of the display data. In this case, the gray-scale voltage has two levels. Thus, the two-gray-scale display can be implemented only by the first fractional time period of the scanning period. That is to say, it is obvious that the later fractional time period is not required. As shown in FIGS. 7(*a*) and 7(*b*), this unnecessary fractional time period is shortened and the vertical blanking interval in its frame interval is lengthened. In addition, there has been conceived a concept to stop the circuit operation whenever possible in this vertical blanking interval. As an alternative concept, by carrying out an operation consuming only little power in this vertical blanking interval, the power consumption of the display device can be reduced.

As an implementation of the concept and idea cited above, FIG. 7(*c*) shows the block configuration of the gray-scale-voltage generation unit. In the configuration shown in this figure, a CMODE input signal is a signal specifying the number of gray scales to be displayed. For example, the CMODE input signal set at the value of 1 or the high level specifies a 3two-gray-scale display and the CMODE input signal set at the value of 0 or the low level specifies a two-gray-scale display. It is desirable to use an instruction issued by an external CPU to change the value of the CMODE input signal. In the case of a hand phone, for example, it is conceivable to issue an instruction to set the CMODE input signal at 0 (low) in an operation to press a dial button or at a call-arrival time and, if no input is received during a predetermined period of time thereafter, again issue an instruction to set the CMODE input signal at 0 (low). In this case, the CMODE input signal is supplied to a switch for controlling the power supply of voltage follower circuits outputting the voltages V1 to V6. The CMODE input signal set at the value of 1 or the high level puts the switch in a conductive state whereas the CMODE input signal set at the value of 0 or the low level puts the switch in a non-conductive state. These operations are carried out because, in the two-gray-scale mode, only two levels, namely, V0 and V7, are used. Thus, by stopping the operations of the circuits for outputting the voltages V1 to V6 all the time rather than carrying out the operations, it is considered that the power consumption can be further reduced.

On the other hand, an AOFF signal is a signal requesting that the circuit operation be stopped. The AOFF signal is set at 1 (the high level) in a display period shown in FIG. 7(*a*) and 0 (the low level) in a vertical blanking interval shown in the same figure. A timing generation unit employed in a driving circuit is capable of generating these values of the AOFF signal. The AOFF signal is supplied to a switch for controlling the power supplies of all the voltages V0 to V7. Much like the CMODE input signal, the AOFF signal set at the value of 1 or the high level puts the switch in a conductive state whereas the input AOFF signal set at the value of 0 or the low level puts the switch in a non-conductive state. Thus, in the vertical blanking interval, the operations of all the voltage follower circuits are stopped. In particular, in the two-gray-scale mode, the rate at which the vertical blanking interval occupies the frame interval is specially high. Thus, the effect of the power-consumption reduction is particularly high. It is to be noted that, taking the restoration time into consideration in the resumption of the operations of the voltage follower circuits, it is desirable to resume the operation to supply power to the voltage follower circuits actually at a time preceding the end point of the vertical blanking interval. In addition, as the control of the operations carried out by the voltage follower circuits, it is possible to adopt control based on a bias voltage among other kinds of control in addition to the power-supply control.

As described above, the display device provided by the fourth embodiment of the present invention halts operations of stoppable circuits in the vertical blanking interval. In addition, if few gray scales are displayed, the scanning period is shortened to increase the rate at which the vertical blanking interval occupies the frame interval. By carrying out this operation, in an operation mode displaying specially few gray scales, a display device having a low power consumption can be provided.

It is to be noted that, in addition to the operation carried out by the gray-scale-voltage generation unit, other operations in a variety of blocks can be stopped or the blocks can be operated at a low power consumption. Another typical operation can be stopped or carried out at a low power consumption by reducing the operating frequency of a charge-pump circuit included in the reference-voltage generation unit 110.

In addition, the fourth embodiment of the present invention is by no means limited to the driving method implemented by division of a scanning period as a method according to a concept of the present invention, but the fourth embodiment can also be applied to the conventional technology. In this case, to cope with the shortening of the scanning period, it is desirable to strengthen the driving power of the voltage follower circuits used in the color-count reduction mode to a value greater than the voltage follower circuits of other gray scales by lowering the output impedance.

The fourth embodiment of the present invention has been explained by taking two gray scales as an example. However, the present invention is by no means limited to such a fourth embodiment. For example, it is needless to say that four and eight gray scales can also be realized. In addition, the color concept is omitted from the embodiment in order to make the explanation simple. As described earlier, however, a color display can be realized with ease by, for example, composing display data of R (red), G (green) and B (blue) data for each pixel and using a panel of the so-called vertical stripe structure in the display unit. In this case, an eight-color display is possible in the two-gray-scale mode described above.

What is claimed is:

1. A driver circuit for driving a display device, comprising:

a gray-scale-voltage generation unit for generating a plurality of gray-scale voltages, each intended for one of a plurality of gray scales; and a gray-scale-voltage select unit for selecting a gray-scale voltage to be output to each of pixel units employed in a display unit in accordance with input display data, the gray-scale voltage being selected from said gray-scale voltages generated by said gray-scale-voltage generation unit;

wherein: each of pixel units employed in said display unit has a transistor and a display element;

a source terminal of said transistor is connected to said gray-scale-voltage select unit;

a gate terminal of said transistor is connected to a scanning line driving portion for sequentially selecting lines for said pixel units;

a drain terminal of said transistor is connected to said display element;

said transistor is in an on-state during a scanning period in accordance with a select signal from said scanning line driving portion;

said gray-scale-voltage generation unit outputs each gray-scale voltage with levels different from each other during differing fractional time periods of a pixel scanning period, the fractional time period obtained as a result of dividing the pixel scanning period;

said gray-scale-voltage select unit selects a gray-scale voltage to be output to each of said pixel units from said gray-scale voltages generated by said gray-scale-voltage generation unit on a time-division basis for each of said pixel units, and uses information of said display data to control length of a time period, during which said selected gray-scale voltage is being output for a pixel unit; and a first one of said fractional time periods obtained as a result of dividing said pixel scanning period is longest among other ones of said fractional time periods.

2. The driver circuit for driving a display device in accordance with claim 1, wherein said gray-scale-voltage generation unit outputs said gray-scale voltages with different levels in a decreasing-level step-by-step order starting with a gray-scale voltage having the highest level among said gray-scale voltages, and ending with a gray-scale voltage having the lowest level among said gray-scale voltages, or, in an increasing-level step-by-step order starting with said gray-scale voltage having said lowest level among said gray-scale voltages, and ending with said gray-scale voltage having said highest level among said gray-scale voltages.

3. The driver circuit for driving a display device in accordance with claim 1, wherein said gray scale voltage select portion outputs said gray scale voltages during a time period between the start of said pixel scanning period and a time at which a number assigned to each of said fractional time periods matches said lower-order bits of said display data.

4. A driver circuit for driving a display device, comprising:

a gray-scale-voltage generation unit for generating (n×m) gray-scale voltages with levels different from each other;

a first gray-scale-voltage select unit for selecting a gray-scale voltage to be output to each of pixel units employed in a display unit, the gray-scale voltage being selected from said (n×m) gray-scale voltages generated by said gray-scale-voltage generation unit in accordance with input display data;

wherein: each of pixel units employed in said display unit has a transistor and a display element;

a source terminal of said transistor is connected to said first gray-scale- voltage select unit;

a gate terminal of said transistor is connected to a scanning line driving portion for sequentially selecting lines for said pixel units;

a drain terminal of said transistor is connected to said display element;

said transistor is in an on-state during a scanning period in accordance with a select signal from said scanning line driving portion; and m second gray-scale-voltage select units, each provided for a group of n gray-scale voltages;

wherein said first gray-scale-voltage select unit selects one of said m second gray-scale select units and selects a gray-scale voltage to be output to each of said pixel units, from said n gray-scale voltages output by said selected second gray-scale-voltage generation unit on a time-division basis, for each of said pixel units in a select operation carried out by controlling the length of a time period, during which said selected gray-scale voltages are being output;

where said n is an integer of the ath power of 2 and m is an integer of the bth power of 2, where a is the high-order bits included in said display data and b is the low-order bits included in said display data.

5. The driver circuit for driving a display device in accordance with claim 4, wherein, in accordance with a fractional time period obtained as a result of dividing a scanning period of outputting said gray-scale voltages to said pixel units by n, said second gray-scale-voltage generation unit selects one of said n gray-scale voltages with different levels in a decreasing-level step-by-step order starting with a gray-scale voltage having the highest level among said gray-scale voltages, and ending with a gray-scale voltage having the lowest level among said gray-scale voltages, or, in an increasing-level step-by-step order starting with said gray-scale voltage having said lowest level among said gray-scale voltages, and ending with said gray-scale voltage having said highest level among said gray-scale voltages, and outputs said selected gray-scale voltage.

6. The driver circuit for driving a display device in accordance with claim 4, wherein said first gray-scale-voltage select unit is outputting a gray-scale voltage output on a time-division basis by said second gray-scale-voltage select unit, until said gray-scale voltage becomes equal, to a gray-scale voltage to be output to said pixel units in accordance with a first data portion of display data for 1 pixel.

7. The driver circuit for driving a display device in accordance with claim 6, comprising a comparison-processing unit for comparing said first data portion with said fractional time period obtained as a result of dividing a scanning period, and outputting an enable (EN) signal to said first gray-scale-voltage select unit as a signal indicating whether or not to continue an operation to output said gray-scale voltage on a time-division basis, from said second gray-scale-voltage select unit in dependence on a result of comparison.

8. The driver circuit for driving a display device in accordance with claim 6, wherein said first gray-scale-voltage select unit selects one of said m second gray-scale-voltage select units in accordance with a second data portion of display data for one pixel.

9. The driver circuit for driving a display device in accordance with claim 4, wherein said a scanning period is divided into n fractional time periods obtained as a result of dividing said scanning period; and said second gray scale voltage select portion outputs said gray scale voltages during a time period between the start of said a scanning period and a time at which a number assigned to each of the fractional time periods matches said lower-order bits of said display data.

10. A driver circuit for driving a display device capable of displaying (n×m) types of gray scale by outputting gray-scale voltages according to input display data to pixel units employed in a display unit, said driver circuit comprising:

a gray-scale-voltage generation unit for generating (n×m) gray-scale voltages respectively corresponding to said (n×m) types of gray scale;

a first gray-scale-voltage select unit for selecting one of m groups, each created for n gray-scale voltages in accordance with a first data portion of said input display data; and a second gray-scale-voltage select unit for selecting one of n gray-scale voltages included in a group, in accordance with a second data portion of said input display data, and outputting said selected gray-scale voltage to said pixel units;

wherein said second gray-scale-voltage select unit selects one of n gray-scale voltages by controlling the length of a time period during which said gray-scale voltages are being output;

wherein: each of said pixel units employed as a display unit, has a transistor and a display element;

a source terminal of said transistor is connected to said second gray-scale-voltage select unit;

a gate terminal of said transistor is connected to a scanning line driving portion for sequentially selecting lines for said pixel unit;

a drain terminal of said transistor is connected to said display element;

said transistor is in an on-state during a scanning period in accordance with a select signal from said scanning line driving portion; and where n is an integer of the ath power of 2 and m is an integer of the bth power of 2, where a is the number of bits included in said first data portion and b is the number of bits included in said second data portion.

11. The driver circuit for driving a display device in accordance with claim 10, wherein said a scanning period is divided into n fractional time periods obtained as a result of dividing said scanning period; and said gray scale voltage select portion outputs one of said gray scale voltages during a time period between the start of said a scanning period and a time at which a number assigned to each of the fractional time periods matches said second data.

12. The driver circuit for driving a display device in accordance with claim 10, wherein said scanning period is divided into a number of sub-periods as indicated by quantitative information contained in z bits;

said display driving circuit outputs said desired gray scale voltage during a time period between the start of said a scanning period and a time at which a number assigned to each of the fractional time periods matches said second data.

13. A driver circuit for driving a display device by receiving display data end outputting a gray-scale voltage according to said display data to each of a plurality of pixel units employed in a display unit, comprising:

a display memory for storing said display data;

a gray-scale-voltage generation unit including as many selectors as indicated by quantitative information contained in predetermined high-order bits of said display data, wherein said selectors each sequentially select one of as many voltage levels as indicated by quantitative information contained in predetermined low-order bits of said display data in accordance with a value of a PH signal specifying one of as many fractional time periods, which are obtained as a result of dividing a scanning period for applying said gray-scale voltage to said pixel units, as indicated by said quantitative information contained in said predetermined low-order bits of said display data, and output said selected voltage level;

a comparison-processing unit for comparing said PH signal with said quantitative information contained in said predetermined low-order bits of said display data and outputting an enable (EN) signal having a value of 1 for said PH signal having a value smaller than or equal to said quantitative information contained in said predetermined low-order bits of said display data or a value of 0 for said PH signal having a value greater than said quantitative information contained in said predetermined low-order bits of said display data;

a latch for latching said display data read out from said display memory synchronously with a start of said scanning period and holding said display data until a start of a next scanning period; and a gray-scale-voltage select unit for selecting one of gray-scale voltages output by said gray-scale-voltage generation unit, in accordance with said predetermined high-order bits of said display data, and outputting said selected gray-scale voltage for said EN signal having a value of 1 or outputting no voltage or exhibiting a high-impedance state for said EN signal having a value of 0;

said gray-scale-voltage generation unit outputs each gray-scale voltage with levels different from each other during differing fractional time periods of a pixel scanning period, the fractional time period obtained as a result of dividing the pixel scanning period;

said gray-scale-voltage select unit uses information of said display data to control a length of a time period, during which said selected gray-scale voltage is being output for a pixel unit; and a first one of said fractional time periods obtained as a result of dividing said pixel scanning period is longest among other ones of said fractional time periods;

wherein: said voltage level of the gray-scale voltage makes a transition step-by-step;

a direction of the transition of said voltage level is reversed for each of frame intervals, which form repetitive periods of a select operation, or is reversed for each of said scanning periods;

said gray scale voltage select portion is divided into a portion on a high-voltage side and a portion on a low-voltage side; and a direction of said transition of the voltage level on said high-voltage side is opposite to a direction of said transition of the voltage level on said low-voltage side.

14. The driver circuit for driving a display device in accordance with claim 13, comprising:

a scanning-line drive unit for applying a select signal to each of scanning lines of said display unit including said pixel units, where each pixel unit is located with respect to an intersection point of each data line and each of said scanning lines; and a timing generation unit for generating an LP signal, which is used for requesting a scanning period, with a timing earlier than the start point of said scanning period, a GP signal determining an output timing of said scanning-line drive unit and said PH signal.

15. The driver circuit for driving a display device in accordance with claim 13, wherein:

said gray-scale-voltage generation unit includes a first amplifier circuit having a MOS device having a first conduction type, and a second amplifier circuit having a MOS device having a second conduction type opposite to said first conduction type; and said amplifier circuits stabilize outputs generated by said selectors on said high-voltage and low-voltage sides respectively.

16. The driver circuit for driving a display device in accordance with claim 13, wherein:

said PH signal output by said timing generation unit is input to said selectors on said low-voltage side by way of an inverter circuit;

said predetermined low-order bits of said display data are input by way of an inverter circuit provided in said comparison-processing unit; and said PH signal is compared with said predetermined low-order bits to determine whether or not to invert the direction of a transition to change said selected voltage level step-by-step.

17. The driver circuit for driving a display device in accordance with claim 16, wherein said gray-scale-voltage generation unit includes a means for adjusting the level of each of said gray-scale voltages.

18. The driver circuit for driving a display device in accordance with claim 13, wherein said gray scale voltage select portion outputs said gray scale voltages during a time period between the start of said pixel scanning period and a time at which a PH signal assigned to each of the fractional time periods matches said lower-order bits of said display data.

19. The driver circuit for driving a display element in accordance with claim 13, wherein:

each of said pixel units has a transistor and a display element;

a source terminal of said transistor is connected to said gray-scale-voltage select unit;

a gate terminal of said transistor is connected to a scanning line driving portion for sequentially selecting lines for said pixel units;

a drain terminal of said transistor is connected to said display element; and said transistor is in an on-state during a scanning period in accordance with a select signal from said scanning line driving portion.

20. A driver circuit for driving a display device by receiving display data and outputting a gray-scale voltage according to said display data to each of a plurality of pixel units employed in a display unit, wherein:

said display data comprises x bits;

said x bits consist of y high-order bits and z low-order bits;

as many gray-scale voltage levels as indicated by quantitative information contained in said y high-order bits are generated;

each gray-scale voltage including a plurality of voltage levels different from each other during differing fractional time periods of a pixel scanning period, the fractional time period obtained as a result of dividing the pixel scanning period;

one of said generated gray-scale voltage levels is selected; and a display-device drive circuit is provided for determining a desired gray-scale voltage by changing said selected gray-scale voltage level step-by-step till a predetermined gray-scale voltage level is attained in one of as many fractional time periods as indicated by quantitative information contained in said z low-order bits;

a first one of said fractional time periods obtained as a result of dividing said pixel scanning period is longest among other ones of said fractional time periods;

wherein a direction of a transition of said voltage level is reversed for each of frame intervals, which form repetitive periods of a select operation, or is reversed for each of said scanning periods;

said gray scale voltage select portion is divided into a portion on a high-voltage side and a portion on a low-voltage side; and a direction of said transition of the voltage level on said high-voltage side is opposite to a direction of said transition of the voltage level on said low-voltage side.

21. The driver circuit for driving a display device in accordance with claim 20, wherein:

each of said pixel units has a transistor and a display element;

a source terminal of said transistor is connected to gray-scale-voltage select unit;

a gate terminal of said transistor is connected to a scanning line driving portion for sequentially selecting lines for said pixel units;

a drain terminal of said transistor is connected to said display element; and said transistor is in an on-state during a scanning period in accordance with a select signal from said scanning line driving portion.

* * * * *